Patented Aug. 20, 1935

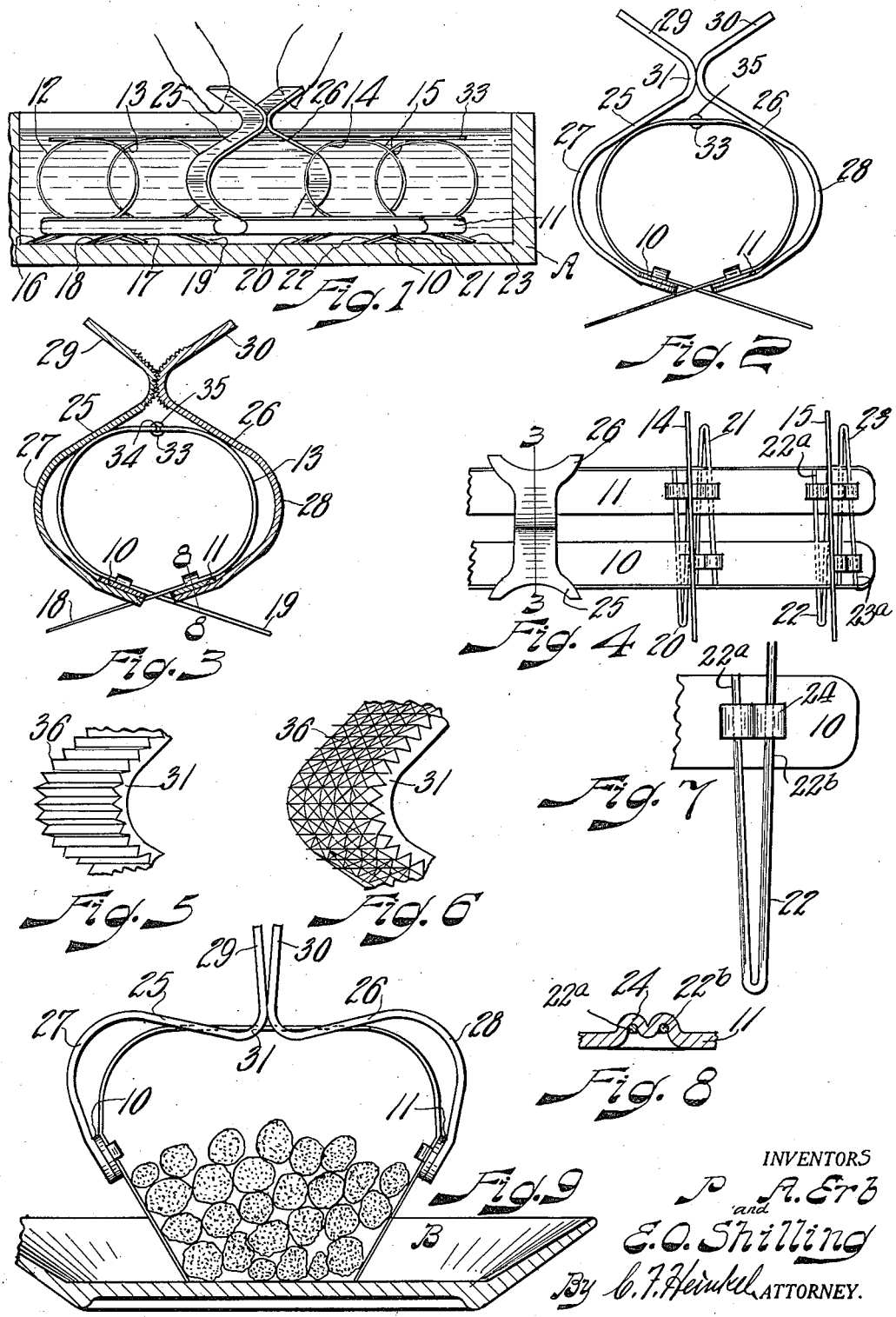

2,011,621

UNITED STATES PATENT OFFICE 2,011,621

MATERIAL HANDLING MEANS

Philip A. Erb, Cleveland Heights, and Ernest O. Shilling, South Euclid, Ohio

Application January 13, 1934, Serial No. 706,476

9 Claims. (Cl. 53—1)

The present invention is disclosed in principle and in some of its structure in our co-pending application Serial No. 633,568, filed September 17, 1932, for Culinary-serving device.

The present invention pertains to handling of materials, particularly of food stuffs, and entails improvements in preparing, for cooking and the like, and in serving of the materials.

An object of the present invention is to provide a method and a device for handling of material in such a manner that fingers of an operator need not come into contact with the material therein during any stage between the placing thereof into the device and the serving thereof.

Another object of the present invention is to provide a means and method most sanitary for preparing and serving food stuffs.

Another object of the present invention is to provide a simple, easily and efficiently operable, and efficient method and means for carrying out the present invention.

Another object of the present invention is to provide such a device with means whereby the same can be opened for reception and discharge of material and automatically closed for retention of material.

Another object of the present invention is to provide a simple, easily operable means and method for operating and handling the device so that an operator may operate the same easily and conveniently with one hand and leaving his other hand free for other activity.

Another object of the present invention is to have the operating means of the device serve as a handle for the device so that the device may be carried about and operated without changing the operating hand thereon or removing the same therefrom or in any manner touching the material therein during its handling and serving.

Other objects will be pointed out in this specification or will become obvious and apparent and suggestive upon an inspection of this specification and the accompanying drawing.

The present invention is illustratively shown in the accompanying drawing forming part of this specification; in which drawing:

Fig. 1 is a perspective view of a device, embodying our invention, for receiving and retaining therein and releasing material therefrom; and shows the device as being placed into a pot for preparation of material in the device.

Fig. 2 is an end view of the device of Fig. 1 on a larger scale.

Fig. 3 is a section taken on the line 3—3 of Fig. 4.

Fig. 4 is a plan view of one end of the device of Fig. 1 on a larger scale.

Fig. 5 is a perspective view of the contacting portions of the handle parts showing teeth extending uninterruptedly across the portions.

Fig. 6 is a perspective view similar to Fig. 5 but showing the teeth interrupted or pyramidic in form.

Fig. 7 is a plan view of the end of one of the receptacle bars with one of the legs secured thereto.

Fig. 8 is a fragmental section, on a larger scale, taken on the line 8—8 of Fig. 3.

Fig. 9 is an end view of the device of Fig. 1 but opened to release and discharge material therefrom onto a plate.

Similar reference characters refer to similar parts throughout the views.

The present invention comprises a receptacle for a material to be opened and closed at a side thereof, feet on the receptacle to hold the same above a supporting surface for the device, and a handle means to control the opening and closing of the receptacle.

The bars 10 and 11 are substantially parallel with each other, form a stiffening means for the receptacle, and are movable toward and away from each other sidewise.

The loop members 12, 13, 14 and 15 are made of spring steel so that the same are resilient both ways for opening and closing of the loops thereof. The ends of the loops are formed into the feet 16, 17, 18, 19, 20, 21, 22, and 23, respectively, by bending the end part of each loop over the part adjacent thereto so that each foot is formed of two substantially parallel portions of the end of the corresponding loop.

Each outer end 23a and 22a of each loop is secured to the corresponding one of the bars. The parts 22b of the loops are also secured to the corresponding one of the bars in the manner shown in Figs. 7 and 8. For this joint between the loop members and the bars, the part 24 is slitted loose from the bar but not entirely separated therefrom and bent inwardly of the bar. The foot and the end of the loop is then pushed through the slot formed by the bending of the part 24 which may then be set upon the parts of the loops to hold the bars to the loops.

A pressure tool is then applied to the part 24, between the wires therein, to press the middle portion of the part 24 toward the bar and thereby permanently hold the loop members to the bars. The same structure is followed with all of the feet. The feet on one end of all of the loop members are thus secured to one of the bars and the feet on the other end of all of the loop members are thus secured to the other one of the bars. It is quite obvious that the loop members can be welded or soldered to the bars or held thereon in any other manner with the object in view of permanently and securely holding the loop members to the bars.

The feet of each loop cross each other to normally close the loops and extend below the loop to retain the loops above a surface of a pot or the like so that material in the receptacle does not come into contact with that surface to provide sanitation and to prevent injury to material in the receptacle during cooking thereof or other heat requiring operation thereon.

The bars 10 and 11 extend longitudinally of the receptacle while the loop members extend transversely of the bars and of the receptacle. This formation, with the feet crossing at the bottoms of the loop members, forms a substantial receptacle with the least amount of material in the wall of the receptacle for the purpose of leaving exposed as much as possible of the surface of material in the receptacle so that heat or other preparatory elements may have free access thereto.

The bars are placed near the bottoms of the loop members so that the same carry most of the weight of the material in the receptacle during preparation and serving thereof thus relieving the very thin loop members of load thereon so that the same may serve the sole purpose of outlining the receptacle and retaining material therein while the same is closed.

The bars are duplicates of each other and the loop members are duplicates of each other to provide economy in structure of the device.

The handle or take hold means for the device is composed of two relatively movable, mutually contacting parts 25 and 26. The part 25 has one end thereof secured to the bar 10 and one end of the part 26 is secured to the bar 11. The middle portions 27 and 28 of the parts 25 and 26, respectively, are curved or arched outwardly of the receptacle to beyond the outside of the loop members so that material within the loop members can not come into contact with the parts 25 and 26.

The parts 25 and 26 have the oppositely outflaring ends 29 and 30 at the top thereof. The arcuate portion 31 of the part 25 is curved or arched inwardly of the handle so that these two portions 29 and 30 can ride on each other when the handle is operated as will be explained herein below.

The handle parts can be adjusted relative to each other by placing in contact with each other different teeth than what is shown in the drawing to adjust the bars 10 and 11 relative to each other when desired for effecting embracing and discharging of material other than the substantially symmetrical embracing and discharging shown.

The tie-rod 33 may or may not be used. Its purpose is to tie the tops of the loop members together so that the same may retain their proper relation and one or more may not be bent out of that relation when the device is carelessly handled. The tie-rod is conveniently attached to the loop members by cutting the slits 34 into the side thereof but severing the part 35 from the tie rod by three sides only and bending the part 35 somewhat away from the tie rod, then putting the tops of the loop members under the corresponding parts 35 and then pressing the partly severed parts 35 against the loop portions similarly as shown in Figs. 7 and 8 and thereby frictionally holding the tie-rod onto the loop members to retain the latter in relation to each other and to prevent one or more of them from being bent by careless handling of the device.

The contacting surfaces of the handle parts 25 and 26 have teeth thereon so that the same move in a definite relation to each other and to retain the parts 25 and 26 and the bars 10 and 11 in a definite relation to each other transversely and longitudinally of the device when the handle parts are and are not operated.

In Fig. 5, the teeth 36 are shown continuous across the faces of the parts 25 and 26. This is an economical manner of providing the teeth but has the objection of not holding the parts 25 and 26 in relation longitudinally of the device although they do relate the same effectively transversely of the device.

In Fig. 6, the teeth 36 are shown as interrupted transversely of the parts 25 and 26 so that teeth of one of the parts engages corresponding teeth of the other part both longitudinally and transversely of the device to hold the parts 25 and 26 and the bars 10 and 11 in desired relations both longitudinally and transversely of the device either when the device is at rest or while the same is being transported or while the same is being operated.

The device shown and described operates as follows:

The bars 10 and 11 together with the resilient material embracing loop members and the feet thereon comprise the receptacle for material. The resilient loop members normally tend to hold the receptacle closed to be opened at one side thereof by moving the bars 10 and 11 away from each other by means of the handle thereon against the action of the resiliency in the loop members and to automatically close itself when pressure on the handle is removed.

When the device is to be loaded or material placed thereinto, such as stem like vegetables, sausages and the like, first bundled by hand or tied into a bundle, or single vegetables and the like, it is taken hold of by the handle without necessity of touching any other part thereof with the fingers or other part of the hand and is held upside down from the positions shown in the drawing. A pressure exerted on the outer ends of the outflaring ends 29 and 30 of the handle parts 25 and 26, toward each other, causes the arcuate portions 31 and 32 to ride on each other and to separate the bars 10 and 11 and thereby open one side of the receptacle whereupon the material can be placed thereinto. A release of pressure from the outflaring ends cause the receptacle to close automatically to embrace the material therein and to retain it therein so that the device can thereafter be turned as shown in the drawing or handled in any other manner without danger of the material falling out of the receptacle.

The device with the material therein is then placed into the pot A or other similar device for preparation of the material in the device. The feet rest on the bottom of the pot and, since the same extend below the bottom of the receptacle, hold the receptacle above the bottom of the pot so that material in the receptacle need not come into contact with the bottom thereof and will not thereby be deteriorated during preparation thereof.

This elevation of the receptacle above the bottom of the pot also provides space between the material in the receptacle and the bottom of the pot for free circulation of a preparing medium, such as cooking liquid, around the material in the receptacle. The sidewise spacing of the bars 10 and 11 also affords a means for allowing the preparation medium free access to the material in the receptacle. The feet close the loops at the bottom and also contact the bars 10 and 11 so that the resiliency in the loops can not contact the bars on each other and thereby hold the bars sidewise spaced to provide a space between them longitudinally of the receptacle.

When the material in the receptacle is fully prepared, as by cooking or other means, appropriate to the material and selection of preparation, either in the pot as shown or in any other manner, the device is removed from the preparing means.

This may be done by taking hold of the handle of the device and lifting the same out of the preparing means. During this lifting, the fingers of an operator need not come into contact with material in the receptacle since the handle extends to and beyond the outside of the receptacle and thereby provides sanitation for the device. When the device gets too hot during the preparation of material therein, the operator may use gloves to protect his fingers against the heat or he may use a hook or some other equivalent instrument to grab the device to lift the same out of the preparing means.

When the so far prepared material is to be further prepared, as by seasoning or other equivalent procedure, the device is taken hold of by the handle and moved about into different and various positions for convenient access to the material therein for such seasoning and the like without the fingers needing to touch the material in the device and without the material being displaced therein.

When the material is fully prepared and ready for serving, the device, while still closed, is set upon a transporting means, such as the plate B shown in Fig. 9 or its equivalent, by taking hold of the handle of the device, without the fingers needing to touch the material therein, and conveying the same to and setting the same onto the transporting means so that the feet rest thereon and thereby keep the material from coming into contact with the transporting means. Transporting of the device and material therein may also be effected by taking hold of the device by means of the handle thereon and moving the same about as desired and even carrying the same to the place of serving without the fingers needing to come into contact with material therein.

When the device is transported to the place of serving, such as the plate B, either directly or by a transporting means, the device is taken hold of by means of the handle, without the fingers needing to come into contact with material therein, and is disposed over the plate B, Fig. 9. A pressure then on the outflaring upper ends of the handle parts to move the same toward each other causes the arcuate, contacting portions of the handle parts to ride on each other, forming a sort of a fulcrum for the handle parts, and thereby move the bars 10 and 11 outwardly and away from each other, against the resiliency of the loop members, and thereby open the receptacle at one side thereof, the bottom side in this instance, to release the material from the receptacle to let the same drop onto the plate by gravity and without the fingers needing to come into contact with the material.

Due to the simultaneous, gradual and even opening movement of the bars 10 and 11 and the feet moving separatingly during opening of the device, the feet form a funnel-like structure to guide the material out of the device and the material is released gradually and without jolt or jar and without breaking it up or even damaging the same in looks and structure.

Thereafter, a lifting movement of the device from the plate, leaves the material on the plate and removes the device from the material without the fingers needing to come into contact with the material.

When the pressure on the outflaring ends of the handle parts is released, after the material is released, the resiliency in the loop members automatically moves the bars 10 and 11 toward each other and thereby closes the receptacle for the beginning of a new operation thereof.

The device shown and described is simple of structure, exposes material therein as far as possible, is efficient in operation as to preparing and serving of material, and is sanitary.

We are aware that our invention can be applied to other devices of the same class as herein shown and described and that changes in structure and arrangement of parts can be made in the device shown and described within the spirit and intent of the present invention and the appended claims.

Therefore, without limiting ourselves to the precise application of our invention as shown and described nor to the structure and arrangement of parts as shown and described,

We claim:

1. A device of the class described having a receptacle normally self closing to embrace and to hold food stuffs therein and made of thin material to expose as much surface as possible of the food stuffs, and a handle means extending from said receptacle to beyond a side thereof and adapted, upon manipulation thereof, to effect opening of said receptacle and to permit self closing of said receptacle.

2. A device of the class described having a receptacle to be opened and closed and comprising substantially parallel bars, loop members of spring material each secured to each of said bars and normally closing said receptacle, and a handle means secured to said bars to transport the device and to control the opening and the closing of said receptacle.

3. A device of the class described having a receptacle to be opened and closed at a side thereof and comprising substantially parallel bars, self closing spring loops transversely of said bars and secured thereto, and a foot formed on each end of each of said loops and secured to said bars.

4. A device of the class described having a receptacle to be opened and closed at a side thereof, related stiffening bars forming part of said receptacle, a handle comprising relatively movable parts, each secured to the corresponding one of said bars, and engaging teeth between said parts to guide the same in their relative movement and to retain the same in longitudinal relation.

5. A device of the class described having a receptacle to be opened and closed at a side thereof, related stiffening bars forming part of said receptacle, a handle comprising relatively movable parts, each secured to the corresponding one of said bars, and mutually engaging means between said parts to guide the same in their relative movement and to retain the same in longitudinal and lateral relation.

6. Laterally spaced, self closing loop members, each having a part to diametrically embrace stem-like material, legs extending from said parts and crossing each other for closing of the loop and forming feet to support the device and to retain the material above a supporting surface and forming funnel-like structure when the loop members are opened, a tie rod connecting said loop members, and means for opening said loop members for insertion of material into the device and discharge of material therefrom.

7. Laterally spaced, self closing loop members, each having a part to diametrically embrace stem-like material, legs extending from said parts and crossing each other for closing of the loop and forming feet to support the device and to retain the material above a supporting surface and forming funnel-like structure when the loop members are opened, a tie rod connecting said loop members, and means for simultaneously opening said loop members for reception of material into and discharge of material from the device.

8. In a device for preparing and transporting and serving of food, co-operating sections related to normally form a receptacle and being relatively movable to deform the receptacle, a handle means composed of parts individually secured to said sections to deform and to transport said receptacle, said parts being interengaging to relate said sections for forming and deforming of said receptacle, and a spring means to relate said sections to form said receptacle.

9. In a device for preparing and transporting and serving of food, co-operating skeleton sections related to normally form a receptacle and being relatively movable to deform the receptacle, the material of said sections being thin where the same contacts the material in said receptacle to expose as much as possible of the surface of the material in said receptacle, a handle means for transporting of the device and having parts secured to respective ones of said sections and being interengaging to relate said sections for forming and deforming said receptacle, and receptacle supporting feet on each of said sections and crossing each other to close said receptacle and extending outwardly of the receptacle when so crossed to retain said receptacle above the support.

PHILIP A. ERB.
ERNEST O. SHILLING.